United States Patent [19]

Taylor

[11] Patent Number: 5,146,942
[45] Date of Patent: Sep. 15, 1992

[54] LOW PRESSURE FLUID EMERGENCY SHUTDOWN VALVE

[76] Inventor: Julian S. Taylor, 8300 SW. 8th, Oklahoma City, Okla. 73128

[21] Appl. No.: 780,180

[22] Filed: Oct. 21, 1991

Related U.S. Application Data

[63] Continuation-in-part of Ser. No. 695,830, May 6, 1991, Pat. No. 5,067,511.

[51] Int. Cl.⁵ .............................................. F16K 17/00
[52] U.S. Cl. ...................................... 137/67; 137/461
[58] Field of Search ................................... 137/67, 461

[56] References Cited

U.S. PATENT DOCUMENTS

| | | | |
|---|---|---|---|
| 4,240,458 | 12/1980 | Huff | 137/461 X |
| 4,724,857 | 2/1988 | Taylor | 137/67 |
| 4,727,903 | 3/1988 | Sturgis | 137/461 |
| 5,067,511 | 11/1991 | Taylor | 137/67 |

*Primary Examiner*—Robert G. Nilson
*Attorney, Agent, or Firm*—Robert K. Rhea

[57] ABSTRACT

A low fluid pressure emergency shutdown valve is formed by a valve body having a flow passageway interposed in a gas supply line downstream from a pressure regulator. A diaphragm responsive valve in the valve body is maintained open by a pin interposed between the valve stem and the downstream end portion of the valve body. Upstream fluid pressure, in response to a pressure regulator failing in the open position, above a predetermined limit biases the diaphragm downstream to collapse the pin and move the valve to a flow passageway closed position.

4 Claims, 2 Drawing Sheets ically aligned confronting bores 58 and 60 which respectively receive a pin bushing 62 for nesting the respective end portion of a pressure responsive pin 64 normally maintaining the valve 30 unseated and the fluid passageway open.

5,146,942

LOW PRESSURE FLUID EMERGENCY SHUTDOWN VALVE

CROSS REFERENCE TO RELATED APPLICATION

This application is a continuation-in-part of an application filed by me in the U.S. Patent and Trademark Office on May 6, 1991, Ser. No. 07/695,830 for HIGH PRESSURE FLUID EMERGENCY SHUTOFF VALVE, now U.S. Pat. No. 5,067,511.

BACKGROUND OF THE INVENTION

1. Field of the Invention

This present invention relates to fluid conductors and more particularly to a valve interposed in a low pressure fluid line between the source of fluid and downstream distribution lines.

In moving fluid under relatively low pressure from a source to a point of usage or for processing, it is desirable, from an economic view point, to utilize distribution line conductors equipped with valves capable of containing the fluid flow and interrupting fluid flow in the event of a malfunction of equipment such as a regulator failing in the open position in the upstream end portion of the distribution line or lines. Such malfunction may result in increased pressure on a low pressure vessel or system and the loss of a considerable quantity of the fluid and create a dangerous situation for equipment or personnel. Relief valves on the low pressure system may prevent a vessel or line rupture but fugitive emissions may still discharge to the atmosphere.

This invention provides an emergency shutdown valve to be interposed in low pressure fluid conductors, such as commercial or residential gas lines, between the source of fluid and a downstream distribution line or lines.

2. Description of the Prior Art

I do not know of any valve capable of monitoring and interrupting low pressure fluid flow in the manner the valve of this invention operates.

SUMMARY OF THE INVENTION

A valve body, having an outstanding flange wall end and inlet and outlet ports having a valve seat at the fluid passageway at the inlet port end, is interposed in a fluid conducting line between the source of fluid and a downstream distribution line. A valve, having a stem slidably supported by one end portion of the body has its valve head normally maintained unseated in an upstream direction with respect to the valve seat by a pressure collapsible pin axially abutting the valve stem opposite the valve seat and supported at its opposite end by a flange wall member secured to the valve body flange and forming a diaphragm chamber. A diaphragm, centrally secured to the downstream end portion of the valve stem, divides the diaphragm chamber. In the event of an upstream fluid pressure regulator failing in the open position, fluid pressure buildup biases the diaphragm in a downstream direction collapsing the pin and interrupting flow through the fluid passageway.

The principal object of this invention is to provide an emergency fluid flow shutdown valve in the event an upstream fluid pressure regulator or valve fails in the open position and downstream pressure reaches a predetermined set pressure of the emergency shutdown valve.

DESCRIPTION OF THE PREFERRED EMBODIMENTS

Figure 1:
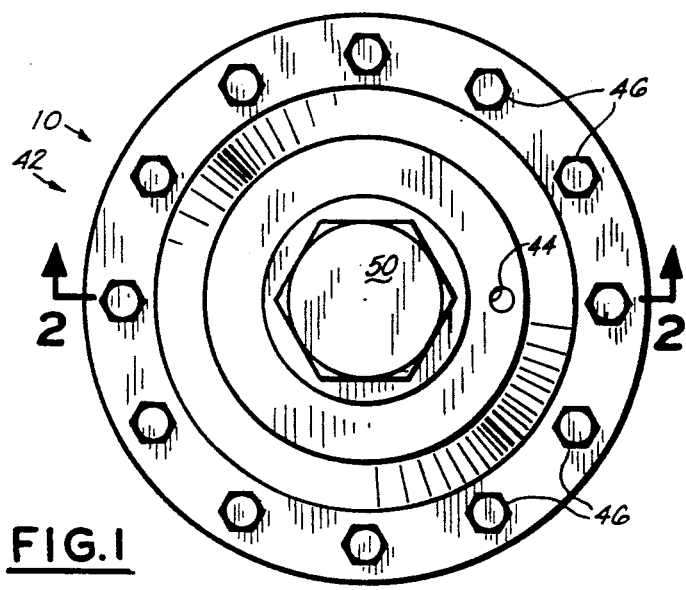
FIG. 1 is an end view of the valve.

Like characters of reference designate like parts in those figures of the drawings in which they occur.

In the drawings:

The reference numeral 10 indicates the valve as a whole comprising an elongated body 12 having a central chamber 14.

One end of the body is axially bored, as at 16, to form an inlet port. The inlet port is counterbored, as at 18, to form a valve seat.

The body is provided with a lateral bore forming an outlet port adapted for connection with a conduit, not shown, and defining a flow passageway indicated by the arrows 22. The body is further axially bored opposite the inlet port as at 24 for the purposes presently explained. An axially offset bore 37 is parallel with the axial bore for the reason presently explained.

A step diameter inlet sleeve 26 is axially connected by its diametrically greater end portion with the valve body around the inlet port 16 with the smaller end portion 28 of the sleeve adapted for connection with a conduit, not shown, carrying fluid to be monitored.

A normally open valve 30 is axially supported by the body. The valve 30 includes a head 32 having an peripheral O-ring seal 34 for sealing with the valve seat 18 as hereinafter explained. The valve 30 is further characterized by an elongated stem 36, hexagonal in transverse section, loosely received by and projecting beyond the downstream body bore 24. A snap ring 25, normally in contact with the valve body opposite the downstream limit of the chamber 14, surrounds an intermediate peripheral portion of the valve stem 36 for the reason presently explained.

The downstream end of the body is further characterized by an outstanding annular flange wall 38 diverging opposite the inlet sleeve 26 to form one half of a diaphragm chamber 40.

A cooperating flange wall member 42 having a wall vent 44, is secured to the body flange 38 by bolts 46 to complete the chamber 40 and impinge the periphery of a diaphragm 48 therebetween. The end portion of the member 42 opposite the valve stem threadedly supports a pin plug 50 in axial alignment with the valve stem 36.

The downstream end of the valve stem 36 axially projects through the diaphragm 48 and threadedly receives a nut 52 impinging the diaphragm between a washer 54 and a backup plate 56.

The downstream end of the valve stem 36 and the upstream end of the plug 50 are each provided with axially aligned confronting bores 58 and 60 which respectively receive a pin bushing 62 for nesting the respective end portion of a pressure responsive pin 64 normally maintaining the valve 30 unseated and the fluid passageway open.

OPERATION

Figure 3:
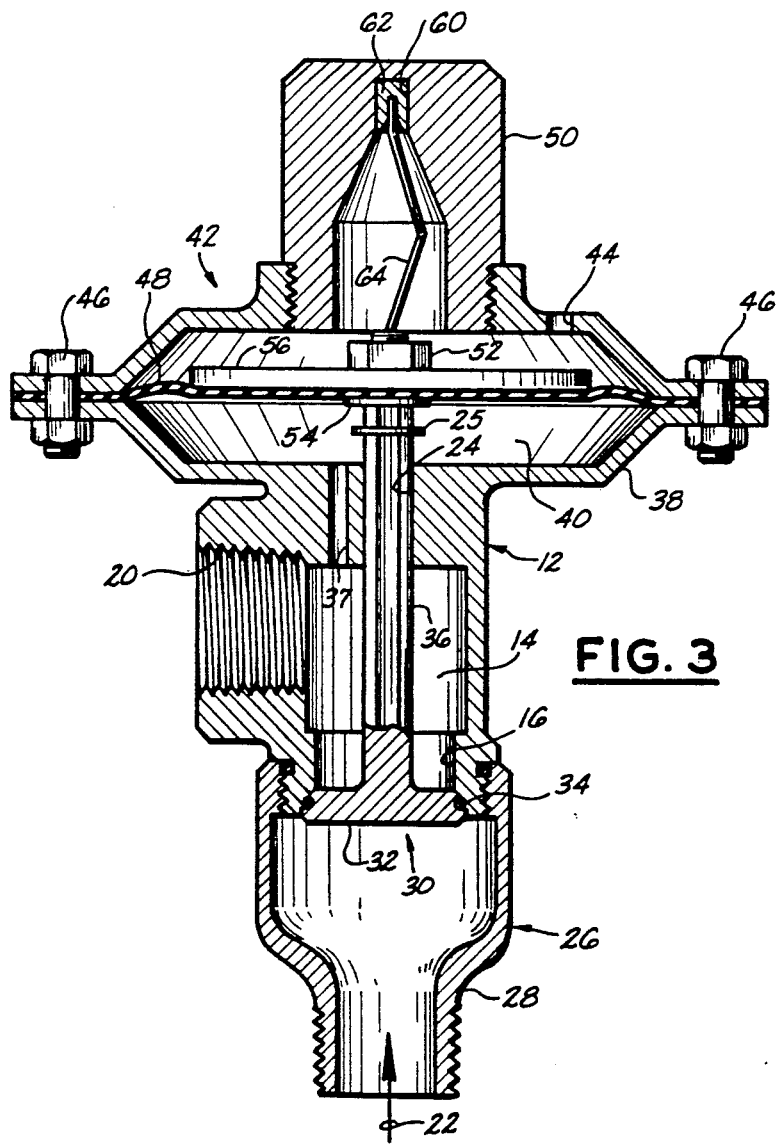

In operation the valve is interposed in a conductor, not shown, for monitoring fluid pressure. In the event of an upstream pressure regulator failing in the open position fluid pressure above a predetermined limit enters the diaphragm chamber 40 through the bore 37 and the area between the fats of the valve stem 36 and the inner periphery of the body bore 24 against the upstream side of the diaphragm 48 to bias it downstream which collapses the pin 64, as shown by dotted lines (FIG. 3). Downstream movement of the diaphragm biases the valve 30 into sealing relation with the valve seat 18, thus closing the inlet port 16 and fluid flow through the valve passageway 22.

Figure 2:
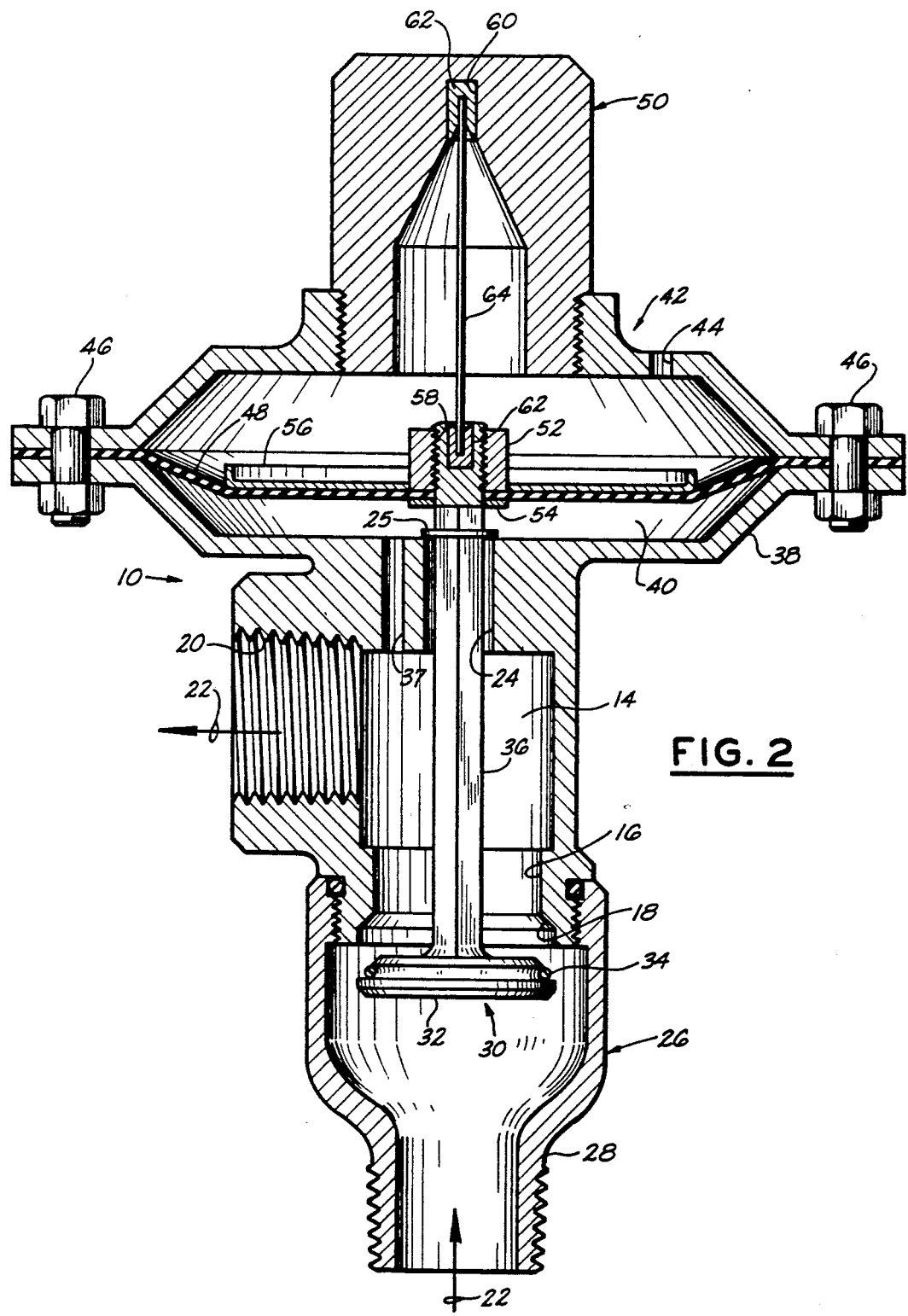
FIG. 2 is a longitudinal cross sectional view, to a larger scale, taken substantially along the line 2—2 of FIG. 1, illustrating the valve in open position; and, FIG. 3 is a view similar to FIG. 2, to a different scale, with the valve stem angulary rotated 30° about its longitudinal axis illustrating the valve in closed position.

When the problem or failure has been corrected, the valve 10 may be reset by removing the pin plug 50 and collapsed pin 64 and manually moving the valve stem 36 axially upstream until the snap ring 25 contacts the valve body and the valve head 32 is in its unseated position (FIG. 2). A new pin 64 is inserted and the valve plug 50 replaced.

Obviously the invention is susceptible to changes or alterations without defeating its practicability. Therefore, I do not wish to be confined to the preferred embodiment shown in the drawings and described herein.

I claim:

1. A low pressure fluid conduit emergency shutdown valve comprising: a valve body having an inlet port and an outlet port forming a fluid passageway interposed in a conduit; a valve seat in the inlet port; normally open valve means supported by said body for movement
toward said valve seat and closing the fluid passageway;
and, axially collapsible pin means for normally
biasing said valve means toward a fluid passageway open position and diaphragm means for biasing said valve means toward said valve seat in response to a predetermined value of fluid pressure in the fluid passageway.

2. The shutdown valve according the claim 1 in which said normally open valve means comprises: a valve having a head for seating on said valve seat; and, a valve stem slidably supported by said body and having an end
portion projecting downstream beyond the fluid passageway.

3. The shutdown valve according to claim 2 in which said body further includes:
flange wall means for forming a diaphragm chamber surrounding the end portion of said valve stem opposite the valve head.

4. The shutdown valve according to claim 3 in which the diaphragm and pin means comprises:
a diaphragm secured to said end portion of the valve stem and dividing the chamber; and,
a rod-like pin axially extending between said valve stem and the flange wall means.

* * * * *